United States Patent
Linihan et al.

(10) Patent No.: US 11,790,394 B2
(45) Date of Patent: Oct. 17, 2023

(54) METHODS AND SYSTEMS FOR AUTOMATIC CALL ROUTING WITH NO CALLER INTERVENTION USING ANONYMOUS ONLINE USER BEHAVIOR

(71) Applicant: Advocado, Inc., St. Louis, MO (US)

(72) Inventors: Jeffrey Linihan, St. Louis, MO (US); Brian Handrigan, Wildwood, MO (US)

(73) Assignee: ADVOCADO, INC., St. Louis, MO (US)

( * ) Notice: Subject to any disclaimer, the term of this patent is extended or adjusted under 35 U.S.C. 154(b) by 0 days.

(21) Appl. No.: 16/356,827

(22) Filed: Mar. 18, 2019

(65) Prior Publication Data

US 2019/0287132 A1  Sep. 19, 2019

Related U.S. Application Data

(60) Provisional application No. 62/644,081, filed on Mar. 16, 2018.

(51) Int. Cl.
| | |
|---|---|
| *G06Q 30/00* | (2023.01) |
| *G06Q 30/0242* | (2023.01) |
| *G06Q 30/0241* | (2023.01) |
| *G06Q 30/0201* | (2023.01) |
| *G06Q 30/0251* | (2023.01) |
| *G06Q 30/0204* | (2023.01) |

(52) U.S. Cl.
CPC ..... *G06Q 30/0244* (2013.01); *G06Q 30/0201* (2013.01); *G06Q 30/0205* (2013.01); *G06Q 30/0269* (2013.01); *G06Q 30/0277* (2013.01)

(58) Field of Classification Search
None
See application file for complete search history.

(56) References Cited

U.S. PATENT DOCUMENTS

| | | | |
|---|---|---|---|
| 8,526,922 B1 | 9/2013 | Koster | |
| 9,118,778 B2 * | 8/2015 | Altberg | G06Q 30/0246 |
| 10,304,080 B2 * | 5/2019 | Fisher | G06Q 30/0242 |
| 2004/0234064 A1 | 11/2004 | Melideo | |

(Continued)

FOREIGN PATENT DOCUMENTS

JP  2017037422 A  2/2017

OTHER PUBLICATIONS

International Search Report corresponding to related International Patent Application No. PCT/US2019/022780 dated May 28, 2019, 3 pages.

(Continued)

*Primary Examiner* — Meredith A Long
(74) *Attorney, Agent, or Firm* — NORTON ROSE FULBRIGHT US LLP

(57) ABSTRACT

A call conversion tracking system is disclosed that tracks call-based communications initiated from invitational content. Based on the tracking, the call conversion tracking system generates data analytics quantifying the effectiveness of the invitational content's ability to trigger a voice call (e.g., a phone call) and/or other type of voice communication. The system correlates the voice communication data and sales-related data, and associates such data to interactions within the invitational content responsible for driving the call and sale.

19 Claims, 6 Drawing Sheets

(56) References Cited

U.S. PATENT DOCUMENTS

| | | |
|---|---|---|
| 2007/0061197 A1 | 3/2007 | Ramer et al. |
| 2014/0314215 A1* | 10/2014 | Duva .................. H04M 3/51 |
| | | 379/88.01 |
| 2015/0066633 A1* | 3/2015 | Agrawal ............ G06Q 30/0246 |
| | | 705/14.45 |
| 2015/0117624 A1 | 4/2015 | Rosenshine |
| 2015/0213512 A1 | 7/2015 | Spievak et al. |
| 2016/0335668 A1 | 11/2016 | Hillman et al. |
| 2017/0256001 A1* | 9/2017 | Isaacson ................ G06Q 20/12 |

OTHER PUBLICATIONS

International Written Opinion corresponding to related International Patent Application No. PCT/US2019/022780 dated May 28, 2019, 5 pages.

International Preliminary Report on Patentability corresponding to related International Patent Application No. PCT/US2019/022780 dated Oct. 1, 2020, 6 pages.

Extended European Search Report corresponding to related European Patent Application No. 19767522.6 dated Dec. 3, 2021, 3 pages.

Notice of Reasons for Rejection issued in corresponding Japanese Patent Application No. 2020-573098 dated Jan. 23, 2023.

* cited by examiner

200B

220

GENERATE A POOL OF TELEPHONE NUMBERS FOR USE IN TRACKING

222

ASSIGN A TELEPHONE NUMBER OF THE POOL OF TELEPHONE NUMBERS TO A PARTICULAR CALLER INTERACTING WITH THE INVITATIONAL CONTENT ASSOCIATED WITH THE ADVERTISING CAMPAIGN

224

DETERMINE WHETHER THE PHONE NUMBER IS ASSIGNED FOR THE FIRST TIME TO THE CALLER OR BEING RE-ASSIGNED TO THE CALLER

FIG. 2B

METHODS AND SYSTEMS FOR AUTOMATIC CALL ROUTING WITH NO CALLER INTERVENTION USING ANONYMOUS ONLINE USER BEHAVIOR

CROSS REFERENCE TO RELATED APPLICATIONS

This application claims priority to and the benefit of U.S. Provisional Application No. 62/644,081, filed Mar. 16, 2018, the entire content of which is hereby incorporated by reference.

TECHNICAL FIELD

Aspects of the present disclosure relate to computing devices and hardware involved in generating and monitoring web-based invitational content that initiates or otherwise triggers call-based communications, such as voice calls.

BACKGROUND

Call tracking is a technology that enables tracked phone calls to be associated with performance-based advertising, such as Google AdWords, Search Engine Optimization Services, Display and Electronic Direct Marketing, and the like. Call tracking also involves supplying analytic information about the tracked phone calls. The present disclosure involves a method and system for providing real-time call tracking and analytic generation, based on online user behavior.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. Also, in the drawings the like reference characters refer to the same parts throughout the different views. The drawings depict only typical embodiments of the present disclosure and, therefore, are not to be considered limiting in scope.

FIG. 2B is a flowchart of an example process for including telephone numbers in invitational content, according to aspects of the present disclosure.

SUMMARY

Figure 1:
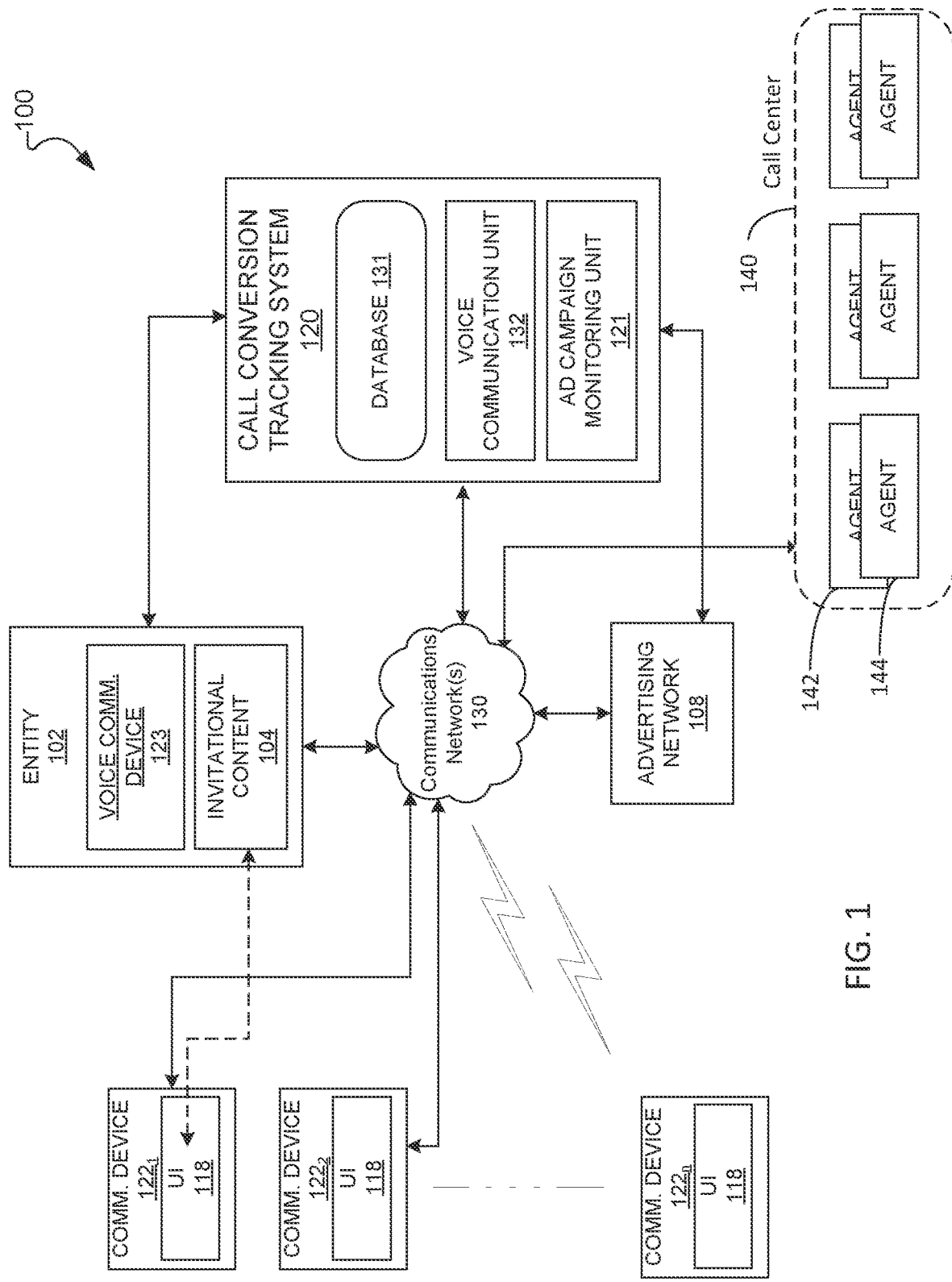
FIG. 1 is a block diagram illustrating a network computing environment for generating and monitoring invitational content that initiates, triggers, and/or routes call-based communications, according to aspects of the present disclosure.

Aspects of the present disclosure involve systems, methods, and non-transitory computer readable mediums for call conversion. The systems, methods, and non-transitory computer readable mediums include modifying, using a computing device, invitational content to monitor users interacting with the invitational content, the invitational content identifying an advertising campaign for a particular product. The systems, methods, and non-transitory computer readable mediums include obtaining, using the computing device, user interactions of a user interacting with the invitational content. The systems, methods, and non-transitory computer readable mediums include obtaining, using the computing device, voice communication data from a voice call initiated by the user in response to the advertising campaign. The systems, methods, and non-transitory computer readable mediums include generating, using the computing device, a graphical user-interface based on the voice communication data, wherein the graphical user-interface displays information correlating a particular user interaction of the user interactions with a portion of the voice communication data.

DETAILED DESCRIPTION

Aspects of the present disclosure involve a call conversion tracking system that automatically tracks call-based communications initiated from invitational content. Generally speaking, one or more types of invitational content can include text, graphics, audio, video, web-based content, interactive content, multimedia content, executable code or any combination thereof. Additionally, the invitational content can be associated with a product or service or can directly or indirectly advertise a product or service.

In various aspects, based on the tracking, the call conversion tracking system may generate various data analytics quantifying and/or qualifying the effectiveness of the invitational content (e.g., an advertisement) to initiate or otherwise trigger a voice call (e.g., a phone call) and/or other type of voice communication. For example, online advertisers are typically interested in understanding how well web-based invitational content, such as advertising campaign(s) (e.g., web-based interactive advertisements), generate sales leads and/or generate actual sales for the products and/or services for which the campaign is advertising. In many instances, such advertisers will convert a sale over some type of voice communication, such as a phone call after a customer has recently interacted with an online advertisement. It is often the case that customers who pick up the phone and make a call after viewing an online advertisement are more likely to make a purchase than customers who only interact with the advertisement online. The disclosed system automatically determines whether a particular invitational content (e.g., an advertisement) actually initiated a sale transaction. Stated differently, the call conversion tracking system may automatically determine and/or quantify the effectiveness of a web-based invitational content's (e.g., an advertisement that integrates a phone number) ability to cause a user to engage in an actual sale transaction.

In one specific example, the call conversion tracking system may be used to evaluate the performance of different keywords in driving calls to phone numbers integrated within the invitational content or otherwise associated with the invitational content. More specifically, the call conversion tracking system implements various algorithms that automatically correlate received calls and/or phone numbers with the keyword(s) associated with specific (e.g., a specific portion) of invitational content. Stated differently, the call conversion tracking system gives advertisers the ability to track and measure which keywords drive sales for consumers—i.e., which keywords cause a customer to interact with the invitational content and make a call based on or in result of the invitational content integrating or otherwise displaying phone number(s). In some embodiments, the system uses the calculated effectiveness of certain keywords to automatically recommend new invitational content (i.e., new advertisement campaigns) for display to users.

In other aspects, the call conversion tracking system may automatically identify voice communications initiated as a result of a user interacting with invitational content, such as an advertisement. In particular, the call conversion tracking system associates initiated phone calls with user interactions occurring at the invitational content. For example, a telephone number may be embedded or otherwise integrated into an invitational content or portion of invitational content, such as a web page. A user visits the web page, triggering a request be sent to a database of the call conversion tracking system. The authenticity of the request is verified and a new entry in a storage capacity of the call conversion tracking system is generated. The new entry may include a unique code (e.g., a numeric code) that may be transmitted back to the web content and displayed as a phone extension. As the user navigates the web page, the current page URL associated with the phone extension may be updated. When the user initiates a voice communication by calling the phone number, the user may be prompted to provide the extension, which may be used to retrieve the invitational content associated with that extension. In response, a new record having a record ID may be recorded in the storage capacity of the call conversion tracking system. When the embedded phone number is dialed and that extension is entered during a voice communication and/or call session, the call conversion tracking system may automatically determine that particular user activities resulted in the phone call being initiated.

Two scenarios in which invitational content, such as an online advertisement, may result in a phone call are: 1) a scenario in which a user sees an online advertisement and calls a phone number included in the advertisement; and 2) a scenario in which a user interacts with an online advertisement, accesses a website corresponding to the advertisement within a certain time period, identifies a phone number on the website, and calls the phone number. In either scenario, there may be challenges associated with determining the effectiveness of the advertisement's ability to cause the user to initiate a phone call or other voice communication. For example, it may be technically challenging determining how to relate a particular call to a particular invitational content, such as an ad impression/query of an advertisement, without using a separate number for each keyword or each ad impression. Additionally, it may be a challenge determining how to incorporate phone calls into a measurement of an advertisement's quality or effectiveness. In general, an advertisement that causes a user to make a phone call to an advertiser is substantially more valuable to the advertiser than an advertisement that causes the user to click on the advertisement.

The disclosed call conversion tracking system solves such technical challenges, among others, by automatically ensuring that a user's interaction with invitational content (e.g., an online advertisement) is continuously and automatically recorded, and associated with any voice communications that are established (e.g., a phone call) as a results of the user's interaction with the invitational content. Thus, the call conversion system may create a closed-loop and automatic system of connecting online advertising with the offline call based sales/conversions that the online advertisements effect. Although the various examples described herein involve web-based invitational content, it is contemplated that any type of content, such as digital content, application content, and/or the like, involved with advertising campaigns may be used.

In some cases, a user may start their interaction with the web-based invitation on one device (such as a mobile smartphone or tablet) and then move to a different device (such as a desktop computer). In these cases, it is possible that the linkage between online advertisement and phone call can be broken. To address this data break, the call conversion tracking system employs a cross-device attribution mechanism that automatically connects two or more different web sessions, wherein the web sessions are modeled (e.g., data fields and data objects) to have similar data by using data points such as web browsing history, date/time stamp of interactions, geo-location analysis of both online and call behavior (possibly using geo understanding of inbound caller id as a model factor as well as others). U.S. patent application Ser. Nos. 16/165,519 and 16/165,576 both discuss cross-device attribution mechanisms and are incorporated by reference in their entirety herein.

In other aspects, the call conversion tracking system includes artificial intelligence and machine-learning mechanisms that are employed to automatically and accurately identify factors driving successful sales. The mechanisms may use various data input factors (obtained by the system), such as effective ad's, keywords, geographies, landing pages, etc. In cases where there is clear content associated with enhanced sales (like keywords, ads, landing pages), the call conversion tracking system may make content suggestions based on such findings, which may improve the search engine optimization (seo) of the web-based invitation or other web-based or ad content.

In some cases, the call conversion tracking system may integrate with ad servers that deliver display and/or video ads to improve the trackability of these ad units when driving calls. To enable such tracking, the call conversion tracking system may generate modified ad tags (the code used to deliver display ads on website, mobile aps and/or video services) and bring the same level of dynamic phone insertion described in 1 to these ad units delivered and displayed on web pages (or aps, etc.), which are different from the web-based invitation content.

Any data collected during the call conversion tracking process may be used to automatically route calls to an appropriate call agent and/or pool of call agents of a call center system, in the event a call involves an inquiry or service request (e.g., a question) from a customer. For example, in a typical arrangement, an enterprise and/or organization may have or otherwise be connected to one or more call centers systems for serving customer requests (e.g., trouble tickets, questions, etc.). The call center system provides a pool of customer service representatives (commonly referred to as "agents") all of whom have various skill levels to provide the customer with a substantially appropriate response to the customer inquiry. Typically, the agents are grouped (referred to as pools) according to their skills, as the enterprises associated with the call centers are concerned with matching customer needs to agents capable of resolving the customer inquiry, question, or issue.

In some examples, the call conversion tracking system may process data automatically and without caller intervention. The system then routes calls to specific agents of a call center and thereby optimizes the allocation of agent resources used to service any received call at a call center system. Typical call centers fail to provide an agent allocation process to thereby require a call center to adapt the operation of the call center to varying incoming call characteristics and agent skill characteristics. Moreover, typical call centers are unable to effectively utilize agents within and between groups thereof, while matching callers and agents in a timely manner. The disclosed system solves these specific technical problems (among others) by employing automatic call routing mechanisms that automatically connect a customer and/or customer call with an available agent (of the call center system) who has the appropriate skills to most efficiently process the customer request.

Typical call distribution systems have two primary components: (1) an identified list of "skills" that agents may have assigned to their user profile (the profile and associated skills are identified against an inbound call station when the agent logs into that station. The "skills" may be hard skills, soft skills or product/technical skills, but the essence of their purpose is to create a profile of the agent so that customer needs (or intended needs) are matched to either the best (or best available) agent when a caller has a sales, support, or other call need); and (2) a mechanism to identify the caller's needs so that their needs can be best matched to the skills in item 1 above. To date, the primary means by which caller's needs have been determined include the use of a live person to screen the call, IVR (interactive voice response) systems and speech to text conversion and analysis systems.

The call conversion tracking system that includes or otherwise executes an automated process of determining a caller's need (and/or intent) without requiring the caller to interact with any of the options identified in item (2) above. Rather, the call conversion tracking system automatically routes calls to the best (or best available) agent using an anonymous digital engagement with a website (or application) prior to their calling. The caller is not required to identify himself/herself by logging into a website, web app or application, in order to enable the automatic call routing.

Additionally, rather than explicit verbal or telephonic input by a caller, the caller's needs are determined via implicit analysis of their behavior prior to making the call. The factors that may influence the inferred need of the caller can include, but are not limited to: (1) metadata associated with the invitational content accessed by the potential caller prior to making the call. For example, the system may automatically analyze website pages viewed in the session prior to making the call to identify metadata associated with the access. Such metadata may include: Page tile; (ii) Page meta tags (i.e. description, keywords, etc); (iii) Page class (i.e. is this a support page, an FAQ, a product detail page, a shopping cart page, a knowledge base page, etc); (iv) Keyword analysis of the pages full-text; (v) image caption and/or alt-text analysis of image assets on the page. The complete session (website or application) of the visitor/user included in the assessment include, but are not limited to: Session duration; Landing page of the session; Last page of the session (prior to the call); Page and viewable page dwell time within the session; Click path of the session; Prior session(s) and repeating content in the session; Search queries conducted during the session; Inbound referral sources, searches and other attributes, such as tracking codes, etc; Similar sessions and resulting call dispositions; and Similar sessions and resulting online support or sales submissions. Tracking individual web sessions provides valuable and detailed information about user behavior, including where the user goes anywhere on the web, how long the user spend at particular sites, and how a user transitions from a first invitational content to a second invitational content, to a third invitational content and so on. Using any of such collected information (and outcomes) as training data for a machine learning engine, the system can automatically generate predictive outcomes of how similar inbound source(s) and onsite behavior resulted, and forecast user intent if they choose to move from an online intereaction to a call-based interaction.

Thus, prior to a call being placed, the call conversion tracking system will automatically conduct an intent/need analysis of the anonymous user's session and store one or more possible need(s) in a data storage and such data will be associated with the session ID and displayed (or coded) phone number for the user to call is/when they determine they need sales/support assistance.

If the user becomes a caller (by calling the assigned phone number) the system will retrieve the one or more possible need(s) associated with the user and then use the corresponding data—similar to how prior systems used people, IVR or voice commands—to identify the best (or best available) agent to assist the caller and then connect the caller with the identified agent with no delay in connection nor caller interaction. This will provide a more seamless and customer friendly experience for both callers and agents.

FIG. 1 illustrates one example of a computer network 100 (e.g., a telecommunications network) that may be used to implement various aspects of the present disclosure. Generally, the computer network 100 includes various devices communicating and functioning together in the gathering, transmitting, requesting, and/or data related to associating invitational content with specific and particular voice communications, such as a phone call. For example, the computer network 100 may be used to track and report what interactions with invitational content are causing users to initiate phone calls and the corresponding metadata associated with the invitational content and phone calls.

As illustrated, a communications network 130 allows for communication in the computer network 100. The communications network 130 may include via or more wireless networks such as, but not limited to one or more of a Local Area Network (LAN), Wireless Local Area Network (WLAN), a Personal Area Network (PAN), Campus Area Network (CAN), a Metropolitan Area Network (MAN), a Wide Area Network (WAN), a Wireless Wide Area Network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, LTE networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols. Network 130 may also include wired networks.

An entity 102 (e.g., a business, organization, group of people, governmental agency, etc.) may provide access to invitational and/or interactive content 104 to users, such as for example an online advertisement, in an attempt to attract business or attention from the users. In one example, the invitational content can be active invitational content. That is, invitational content that is designed to primarily elicit a pre-defined response from the user. For example, active invitational content can include one or more types of advertisements configured to be clicked upon, solicit information, or be converted by the user into a further action, such as a purchase or download of the advertised item. However, invitational content can also include passive invitational content. That is, invitational content that is designed to primarily inform the user. In some cases, passive invitational content can include information that can lead or direct users to active invitational content. Additionally, the invitational content can be dynamic invitational content. That is, invitational content that varies over time or that varies based on user interaction with the invitational content. However, the various embodiments are not limited in this regard and the invitational content can be static invitational content that does not vary over time or that varies based on user interaction.

In one specific embodiment, invitational content 104 may include one or more advertisements. In such a scenario, the entity 102 may connect with an advertising network 108 to provide such advertisements to users. To specify how advertisements are distributed, the entity 102 may generate an ad campaign with the advertising network 108. In one specific example, Ad campaigns may be specified by some or all of the following parameters: campaign name (e.g., name or theme for advertising), type of advertisement (e.g., search only, display only, search and display), network where the ad will appear (e.g., on GOOGLE or on non-GOOGLE sites), devices that should receive the ad (e.g., desktops, tablets, and mobiles), languages and locations where the ad may be displayed, bidding and budget strategy associated with the ad (e.g., bid strategy specifies how much an advertiser is willing to pay for users to interact with ads), and available ad formats (e.g., text ad, image ad, rich media ad, videos). Each ad campaign has one or more advertisements. The advertising network 108 may be any add network capable of aggregating and supplying advertisements and connecting advertisers to invitational content that want to integrate or host advertisements.

The invitational content including advertisements are displayed to one or more comm. devices $122_1$, $122_2$,-$122_N$, which may be may be a personal computer, work station, mobile device, mobile phone, tablet device, processor, and/or other processing device capable of implementing and/or executing processes, software, applications, etc., that includes network-enabled devices and/or software, such as a user-interface 118 for communication over the communications network 130 (e.g., browsing the internet). Additionally, the one or more comm. devices $122_1$, $122_2$,-$122_N$, may include one or more processors that process software or other machine-readable instructions and may include a memory to store the software or other machine-readable instructions and data. In the illustrated embodiment, the advertisements are displayed via the invitational content 104 provided by the entity 102. However, it is contemplated that the documents may be displayed alone or in documents, messages, emails and/or other sources of electronic content other than the invitational content 104.

In an illustrative usage scenario, a user accesses invitational content 104 of the entity 102, by interacting with the UI 118 of the one or more comm. devices $122_1$, $122_2$,-$122_N$. The user is motivated 8 to initiate a voice communication to the voice communication device 123 of the entity 102 base on, for example, an advertisement included in the invitational content 104 displayed in the UI 118. While the example above describes a user's interaction with a web page, it is contemplated that the user's decision to initiate a voice call may be motivated by network-based content other than a website that the user accesses, such as an e-mail, video, and/or any other network-accessible content provided by the entity 102. The voice call can be established using the communications network 130, or other network in communication with the communications network 130. The voice communication device 123 may be a telephone, mobile phone, computer, smart phone, mobile communication device, and/or the like, and may be located within or near the entity 102 as illustrated, or somewhere remote.

A call conversion tracking system 120, including one or more processor(s), communicates with the entity 102 and the advertising network 108. In some embodiments, the call conversion tracking system 120 receives details about one or more ad campaigns included in the invitational content 104 provided by the entity 102. For example, the call conversion tracking system 120 may receive or otherwise collect information including phone numbers associated with an advertising campaign, keyword lists, bidding strategy, and advertising distribution network preferences from the advertising network 108 and/or the entity 102, at the ad campaign monitoring unit 121. Additionally, the entity 102 can provide internal advertiser information that was not provided to the advertising network regarding the ad campaign. For example, the internal advertiser information may include call data such as the number and time of received calls to the advertiser via different phone numbers. Internal advertisers may also include bidding information for ad campaigns or call data such has who spoke with consumer.

In some embodiments, the call conversion tracking system 120 may receive metric datafrom the advertising network 108. Metric data represents quantifiable measures that are used to track and assess the value of an advertisement provided by the advertising network. Thus, metric data includes, for example, the number of ad impressions, the click-through rate on advertisements, and average cost paid per advertisement for an advertisement campaign provided in the invitational content 104 of the entity 102. Other metrics may include: CPM—This is the cost for 1000 Impressions of the ad unit. Display advertising is generally sold on CPM basis; Clicks—Number of clicks on an ad unit that lead to a person leaving the ad unit. Keep in mind that a click does not mean that a person landed on the intended destination of the banner ad click. There are multiple factors that could lead to a click but not a visit to the destination (I won't cover those here but am happy to discuss over email or a call); Page Views/Visit—Page views the number of pages on your site viewed by each visit. With a lot interactions happening on one single page, this metrics is losing its value. However, for now, it is still a valuable metric for ad supported sites; Cost/Page View—As above, this is valuable metrics for ad supported site to figure out the cost of generating on extra page view; Conversions—Conversion is defined as the count of action that you want the visitors to take when they arrive from you display ads. Some examples of conversions are—purchase, signup for newsletter, download a whitepaper, sign up for an event, Lead from completions etc.; Conversion Rate—This is the percentage of visits that resulted in the desired conversion actions. Conversion Rate=Total conversions/visits*100. If you have more than one conversion actions then you should do this calculation for each one of the action as well for all the actions combined. In case of Leads, you can take it one step further and calculate not only the "Leads Generation Rate" (Online Conversion Rate) but also Lead Conversion Rate, which is, Leads that convert to a customer divided by total leads generated; Cost per Conversion—This is the Total Cost divided by the number of conversions achieved from visits coming via display ads; Revenue—This is total revenue that is directly attributed to the visits coming from display advertising. It is pretty straightforward to calculate in eCommerce but gets a little tricky when you have offline conversions; Revenue per Visit—Shows the direct revenue achieved per visit originating from the display advertising.

It is calculated as Revenue Generated from Display Ads divided by the total Visits; Revenue per Page—This is useful for ad supported business models. This is sometimes expressed as RPM (Revenue per thousand impressions of ads)=(Total Ad Revenue/Number of page views)*1000.

As will be described in additional detail herein, by correlating metric data with the voice communication data, the call conversion tracking system 120 may automatically determine the effectiveness of ad campaigns in generating calls to displayed numbers. Based on such determinations, the call conversion tracking system 120 may automatically generate recommendations of improvements to the ad campaigns.

The call conversion tracking system 120 may automatically route calls, via the voice communication unit 132, without caller intervention, to a call center 140. In particular, the call conversion tracking system 120 may automatically identify a best-qualified agent of a call center 140 from the available agents in agent pools 142 or 144 (e.g., agents not already handling a call). As will be discussed below, various criteria or factors may be considered to determine the best-qualified agent. If no agents are available in the selected pool, another pool may be chosen, such as one defined by characteristics similar to the selected pool. Thus, there may be a hierarchy of pools for a given call or type of call, with each pool considered in turn if the ones before it are empty.

When the best-qualified agent is selected, the call manager automatically establishes the outbound call leg to the agent and connects it to the inbound call leg from the caller. The call manager may monitor or record, or facilitate the monitoring or recording, of any portion of the call.

Closed-loop ecommerce transaction tracking (using Google Adwords as an example advertising channel) is illustrated in FIG. 1. But bringing the precision of closed loop online advertising to ecommerce transaction tracking to offline (i.e. call-based) sales has been technically limited. Many of the solutions that have been developed use a "channel" based approach that associates different phone numbers with the advertising channel that drove the call. So this could be as broad as using "Google" as a channel to represent all Google search traffic or more granular, down to the Campaign, AdGroup, Ad or Keyword level. The issue with all of these methods is that such methodologies cannot attribute any call-based activity to a specific "click (or tap) instance" representing the exact moment and data that drove the interaction (i.e., caused the user to initiate the call). The disclosed system enables closed-loop tracking and automatically captures both the voice communication call data and the actual sales-related data, and associates such data to the actual "click-level" interaction responsible for driving the call and sale. The system does so with no human interaction (other than the user initiating a call). Stated differently, the process may be fully automated and performed in a fully automated manner with no human intervention.

Figure 2A:
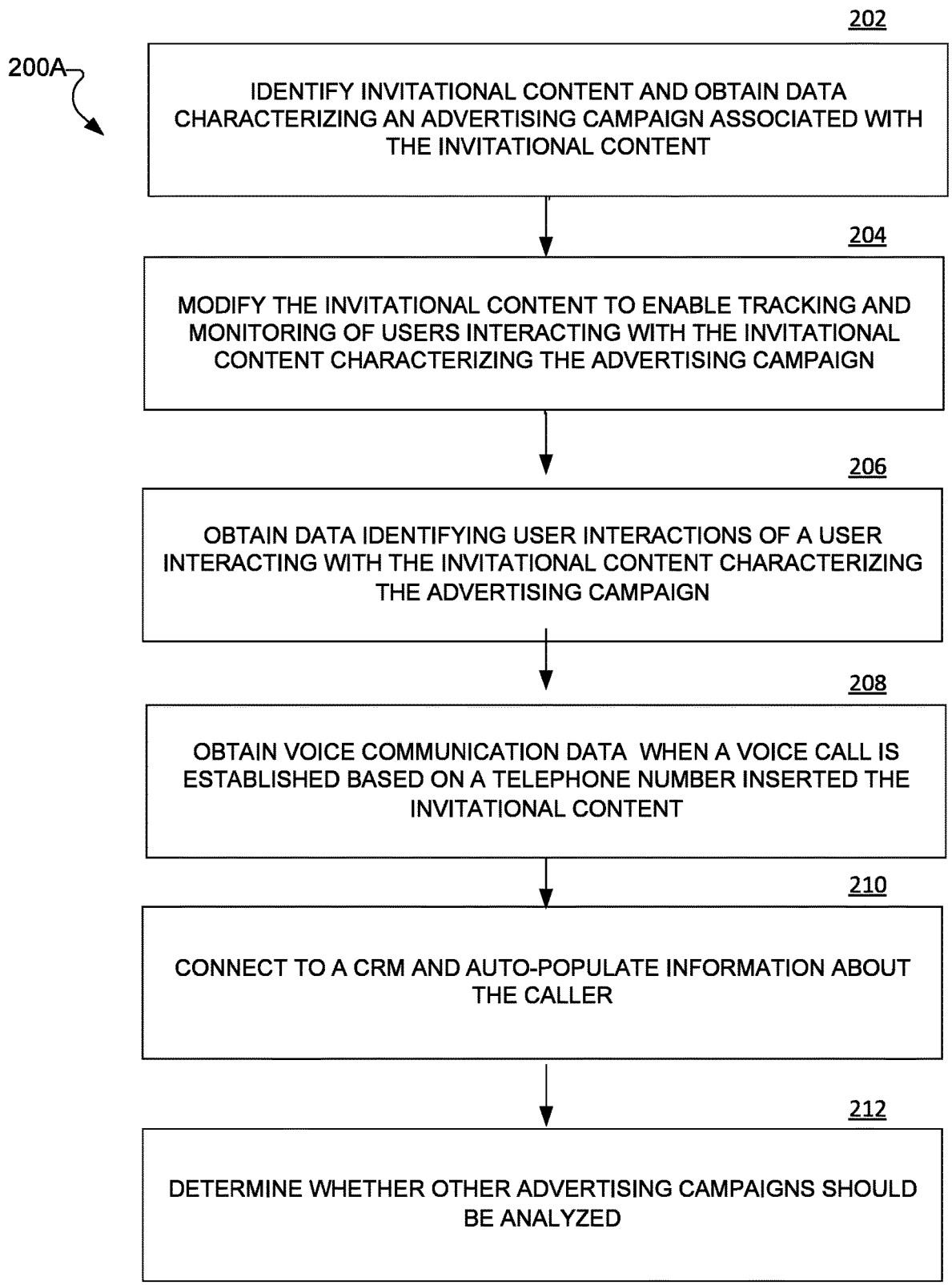
FIG. 2A is a flowchart of an example call-based conversion process, according to aspects of the present disclosure.

Referring now to FIG. 2A and with reference to FIG. 1, an illustrative offline call-based conversion process 200A implemented by the call conversion tracking system 120 is provided. The process may be implemented and/or otherwise executed by the computing network 100 of FIG. 1.

The process 200A begins at 202, wherein a call conversion tracking system 120 identifies invitational content, such as a web page, capable of being presented to users and/or currently being presented to users (e.g., at the one or more comm. devices $122_1$, $122_2$,-$122_N$) and obtains data characterizing an advertising campaign associated with the invitational content. In one specific example, the call conversion tracking system 120 may identify an advertising campaign from the invitational content and retrieve: keywords used in the ad campaign (which may span one or more ad groups); network information associated with the ad campaign; unique identification information corresponding to the invitational content including the advertisement(s); and/or phone numbers corresponding to the advertising campaign. The call conversion tracking system 120 may receive such ad campaign information from the advertising network 108 and/or the entity 102. Alternatively, the call conversion tracking system 120 may have provided the phone numbers to the advertisers for use as call tracking numbers, which allows for the call conversion tracking system 120 to directly collect metric data.

In the event that the advertising network 108 is responsible for generating the ad campaign, the call conversion tracking system 120 may obtain the unique ID in the form of a passed variable (e.g., from the advertising network) or a web session variable stored in the session data, from the advertising network 108, which is associated with the ad campaign and/or the invitational content integrating the advertisements and ad campaign. In any scenario, the call conversion tracking system 120 can uniquely identify invitational content, associate the invitational content to a specific advertisement and/or ad campaign, and associate the advertisement and/or ad campaign with a user's interactions with the ad campaign and invitational content by associating the advertising network unique ID with a system generated unique ID assigned to each online session that is tracked.

In step 204, the call conversion tracking system modifies the invitational content associated with the ad campaign and/or advertisements to enable tracking and monitoring by the call conversion tracking system of users interacting with the invitational content. To do so, the system may dynamically insert one or more telephone numbers (or other unique identifier for establishing a voice communication) into the invitational content. For example, a telephone number may be embedded into the invitational content (e.g., a webpage, mobile app, in-video, among other content) provided to a user. Alternatively, the phone number may already be included in the invitational content.

FIG. 2B illustrates an example process 200B for including a telephone number in invitational content. As illustrated, FIG. 2B starts at step 220, with generating a pool of telephone numbers for use in tracking. The quantity of phone numbers required for accurate tracking precision is determined by an algorithm that inputs data points like, daily website visitors, daily calls, average time between web visit and call, average call duration, etc. From these discrete data points, a quantity of phone numbers is calculated to ensure that the appropriate number of phone numbers is in the pool to rotate to different web visitors (and re-use) but not too many.

At step 222, a telephone number is selected from the pool of available telephone numbers and assigned to an advertising campaign. The phone number is not (in general) assigned to a specific advertising medium, campaign or ad; rather, the phone number is assigned to the anonymous web visitor with all of the incoming advertising metadata that is typically provided to a web server when a user clicks (or taps) an online ad. In the case of some specific advertising platforms (Google for example), the metadata can take the form of an internal id that can be used to communicate explicitly with the applicable advertising platform and/or network via API, such as the advertising network 108. In one specific example, the At step 224, once a number is assigned, there may be a series of conditions to determine if the number is being re-presented to the visitor on a subsequent visit as well as a series of conditions to determine of a phone number is put back into assignment rotation. For example, the call conversion tracking system 120 may execute a series of conditions to determine whether the visitor called the number, the visitor is associated with the number, the visitor previously accessed an advertisement originally associated with the number, or other items and so on. Once validated, the identified phone number may be associated to a specific web session for a period of time. This allows the system to accurately link each call to a web session if it results in a call being made to the number shown, as explained above and below.

Referring back to FIG. 2A, in step 206, the call conversion tracking system 120 may obtain various interactions of the user with the invitational content characterizing the specific advertising campaign. For example, assume the invitational content is web content, such as a webpage, encoded with the telephone number, and accessible through a uniform resource locator (URL). In such a scenario, the system may receive identification of a plurality of clicks of the uniform resource locator (URL) links and identifies, for each of the plurality of clicks, data about a user who clicked the URL link and traffic data associated with a device from which the user clicked the encoded URL link. In another example, the system may receive identification of the first plurality of actions of the user from one or more cookies associated with the user and the URL. In another specific example, the system may identify, for each of the plurality of clicks, data about a user who clicked and traffic data associated with a device from which the user clicked the encoded URL link. The system may store a record for each click of the plurality of clicks, the record comprising data about the user and traffic data associated with each click.

In step 208, the call conversion tracking system 120 obtains voice communication data (e.g., phone call data) that is associated with the advertisements and/or ad campaigns of the invitational content when a voice call is established using the telephone number included in the invitational content. In particular, the call conversion tracking system 120 obtains voice communications data based on telephone numbers that are associated with the ad campaign integrated in the identified invitational content. More specifically, the voice communication device 123 logs the voice communication data against the unique code associated with the invitational content, and creates a database record in the database 131, or a record in the entity 102 and forwards the established voice communication to the voice communication device 123. The voice communication data may identify a particular caller and or user engaging with the invitational content. Alternatively, the caller or user may remain anonymous.

In one specific example, the call conversion tracking system 120 will attempt to establish the connection of the call to the final call destination. The destination may be an IVR (interactive voice response) system, a phone extension, a call group or other vehicle for distributing calls to sales agents. Referring to FIG. 1, the call may be established at the voice communication device 123 of the entity 102 and/or at the call center 140. In some instances, a transaction identifier indicating the completion of a sale transaction is stored at the database 131 of the call conversion tracking system 120. In some instances, the call conversion tracking system 120 may provide the data to the entity 102 for review and analysis.

In one specific example, when a user calls the number presented to them, the phone call is initially connected to the call conversion tracking system 120 that then looks up in a database, the web session metadata associated with the last assignment of the called phone number and also stores in the database the incoming caller id of the user's phone making the call. In some instances, the call conversion tracking system 120 may also look up from the database the geographic region that the website session originated in, the final call destination (either via POTS [plain old telephone service] or SIP [session interchange protocol]) of the call based either as a global setting or specific assignment due to multiple criteria like lead score, inbound channel, pages on site viewed, and others. By combining the known data elements, such as inbound caller ID, web session unique ID, assigned phone number, assignment geography and average time to call, the system calculates the probable web session unique ID that the caller originated from.

At step 210, while the call conversion tracking system 120 is connecting the call, the call conversion tracking system 120 may connect to a customer relationship management ("CRM") system (CRM to include any customer relationship management, contact management, call center management or other system of record where leads and/or customer data is stored) and insert or update a record to include the known information about the caller. This information may include inbound caller id, unique tracking number (from the call conversion tracking system), online advertising tracking metadata, web pages viewed and in some cases will include augmented record detail from internal or external systems.

In another example, the call conversion tracking system 120 may generate one or more dashboards, graphical user-interfaces, and/or the like that presents correlations between advertisements in an intuitive and visual way. For example, the graphical user-interfaces may display a list of interactive results for easy viewing and/or playback or in a manner that allows such content to be displayed in the dashboard itself allowing user access to said content in an easy and automatic manner. In some cases, the call conversion tracking system may generate one or more dashboards, graphical user-interfaces, and/or the like that presents to digital marketing audiences. In some cases, the call conversion tracking system 120 may generate one or more dashboards, graphical user-interfaces, and/or the like that analyze the sales effectiveness of digital advertising across digital advertising platforms and either make suggested changes to optimize performance or in some cases automatically make the changes directly.

In some cases, the call conversion tracking system 120 may generate one or more dashboards, graphical user-interfaces, and/or the like that analyze the sales effectiveness of ad position (like actual position or content context, etc.) within and/or across digital advertising platforms and either make suggested changes to optimize performance or in some cases automatically make the changes directly.

In some cases, the call conversion tracking system 120 may generate one or more dashboards, graphical user-interfaces, and/or the like that analyze the sales effectiveness of ad content and/or call to action within and/or across digital advertising platforms and either make suggested changes to optimize performance or in some cases automatically make the changes directly.

In some cases, the call conversion tracking system 120 may generate one or more dashboards, graphical user-interfaces, and/or the like that analyze the sales effectiveness of keyword or targeting criteria within and/or across digital advertising platforms and either make suggested changes to optimize performance or in some cases automatically make the changes directly.

In some cases, the call conversion tracking system 120 may generate one or more dashboards, graphical user-interfaces, and/or the like that budget effectiveness within and/or across digital advertising platforms and either make suggested changes to optimize performance or in some cases automatically make the changes directly.

In some cases, the call conversion tracking system 120 may use the data collected (possibly with artificial intelligence and machine learning) to analyze the sales effectiveness sales reps when receiving calls within and/or across digital advertising platforms and either make suggested changes to optimize performance or in some cases automatically make the changes directly.

In some cases, the call conversion tracking system 120 may use the data collected (possibly with artificial intelligence and machine learning) to analyze return on investment maximization (possibly including increasing or decreasing budgets) within and/or across digital advertising platforms and either make suggested changes to optimize performance or in some cases automatically make the changes directly.

In decision step 212, the call conversion tracking system 120 determines whether additional advertising campaigns should be analyzed. If additional campaigns remain to be analyzed, processing continues again at step 202 with data associated with a different invitational content. Otherwise, processing ends.

Figure 3:
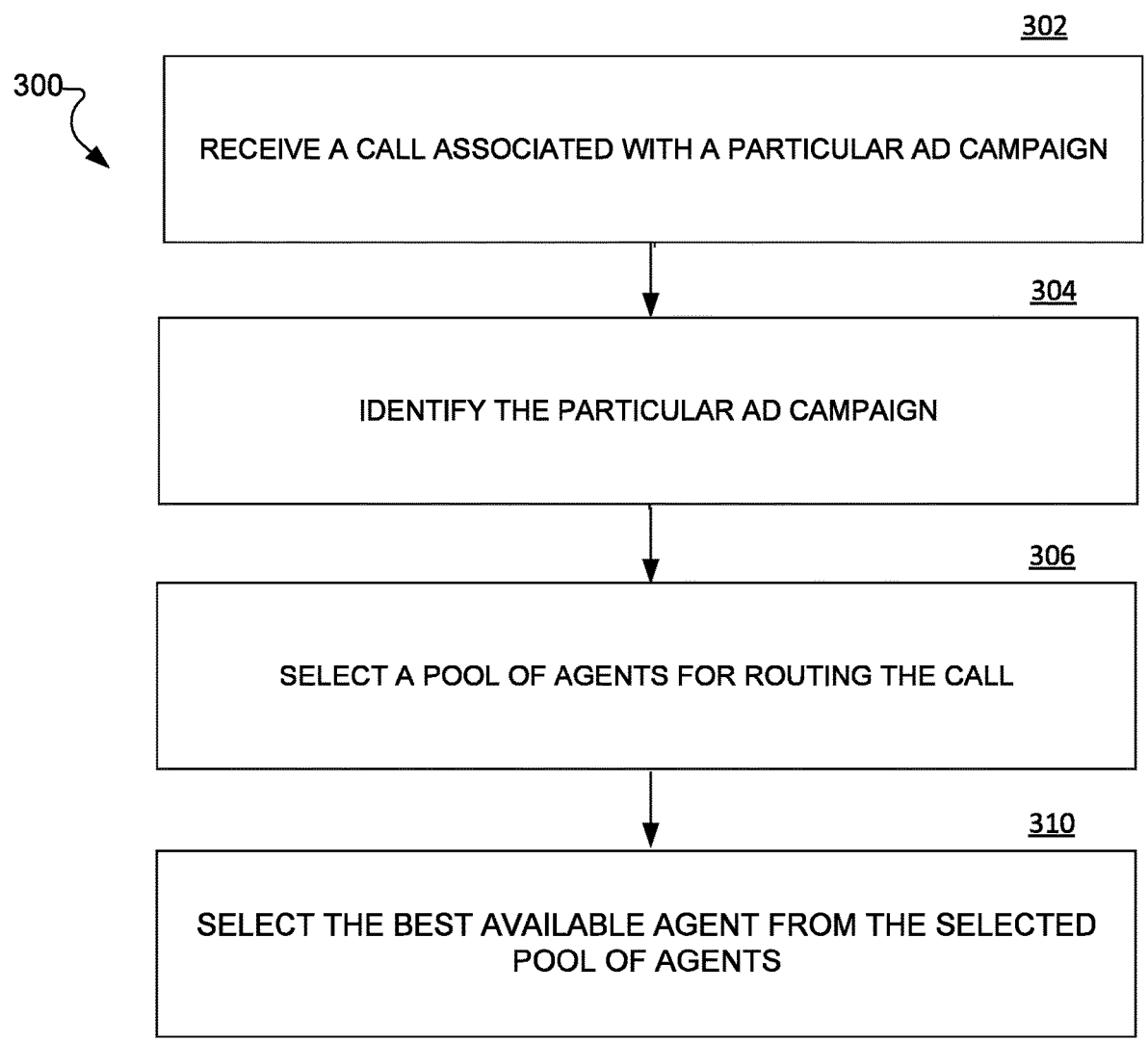
FIG. 3 is a flowchart or of an example call-routing process, according to aspects of the present disclosure.

Referring now to FIG. 3 and with reference to FIG. 1, an illustrative process 300 for routing a telephone call based on call conversion data is provided. As illustrated, the process 300 begins with operation 302, where a call to a telephone number associated with a particular ad campaign is received. For example, a call may be received or otherwise identified at the call conversion tracking system 120. Various pieces of the call may be tracked (e.g., the caller's geographical area), retrieved or saved. At step 304, the campaign associated with the destination telephone number of the call is identified. More than one telephone number may be associated with one campaign, and more than one campaign may be associated with one telephone number. At step 306, the call server selects a pool of a call center system to route a call, based on the identification of the campaign. This selection may be made on the basis of weights associated with each pool. Referring to FIG. 1, a pool of agents 142 or 144 may be identified. As long as at least one agent in a given pool is available, the call may be assigned to that pool.

At 310, the best available agent in the selected pool is identified, and the call is routed to the identified agent (e.g., a call leg is established between the call server and the agent). A routed call is a call that begins with an online interaction between the customer and the brand. A routed call involves the clicking of a digital advertisement; the linking to a brand website or landing page; the navigation by the customer throughout that website and/or landing page; the use of dynamic number insertion on that website and/or landing page; and the ultimate phone call to that dynamically inserted telephone number.

When a sales agent accepts the call, if the call center is equipped with CTI (computer telephony integration), the known record for the user will be displayed to the sales agent as they answer the call. If the call center is not equipped with CTI, the call conversion tracking system 120 will communicate a record locator id via one-sided audio communication the sales agent. If the call center is not equipped with any form of CRM, the call conversion tracking system 120 will provide a web-based interface to locate and update call records. During the duration of the call, the sales agent will use their normal tools to record a sale.

After the sale is complete, if the call center is equipped with a CRM, the call conversion tracking system 120 will query the CRM for the final status of the sale and its value. If the call center is not equipped with a CRM, the sales agent may be prompted via one sided audio to confirm that a sale did or did not occurred by entering a numeric value via touch tone. If a sale did occur, the sales agent will be further prompted via one-sided audio to enter the value of the sale in whole numbers via touch tone. In addition or in place of the method described above, the agent may log into the call conversion tracking system 120 and manually enter the sale value via a web-based interface.

On a time schedule, the call conversion tracking system 120 will collect the sales values and transmit them to a multitude of advertising platforms (like Adwords, Facebook, etc.) and/or analytics platforms (like Google Analytics, Omniture, etc.). Once the data is transmitted to the advertising and/or analytics platforms the call conversion tracking system 120 may update the CRM system to indicate that the sales that have been connected to online activities have been uploaded. By communicating specific sales and value data to advertising platforms with a precision similar to ecommerce transactions, the advertising platforms can use their internal optimization systems to improve the quality of advertising for future digital advertising interactions.

Once a caller calls the dynamically inserted tracking phone number, because the call routes over a managed telephony system and is essentially connected or forwarded to the call conversion tracking system 120, the system 120 is able to transmit all of the anonymous data around the caller's pre-call online journey. As the call is being connected/forwarded, the customer's anonymous footprint detailing their entire pre-call web journey is available to the system. Using this data, the system can ascertain the true intent of the caller's inquiry and dynamically route's the call to the best or best available agent without any additional voice or electronic interaction with the customer. Referring again to FIG. 3, illustratively, the call conversion system 120 routes (i.e., instructs) to the particular agent in the call center 140 based on call conversion data processed using machine-learning mechanisms.

In some cases, the online advertising may generate excessive call volume and overwhelm the available agents—this may result in long call hold times and even risk losing calls which cost the advertiser significant money. To address such issues, the call conversion system 120 automatically monitors the communication between the call conversion tracking system 120 and the call center operations system 140 (which manages call distribution, etc.). In cases where the call conversion tracking system 120 determines that the number of available call center agents (to take calls) is approaching (or has achieved) full capacity, the call conversion tracking system 120 may communicate to the online advertising platforms (like Google, Facebook, etc.) and adjust factors in the active campaigns (like status [i.e. pause the campaign], budget, bid level and other factors that may reduce or temporarily halt the inbound call volume) to reduce lost calls. Additionally, the call conversion tracking system 120 may continue to monitor the call center operations system to determine that agents have become available and that the online advertising campaigns should have their adjusted factors returned to normal.

Figure 4:
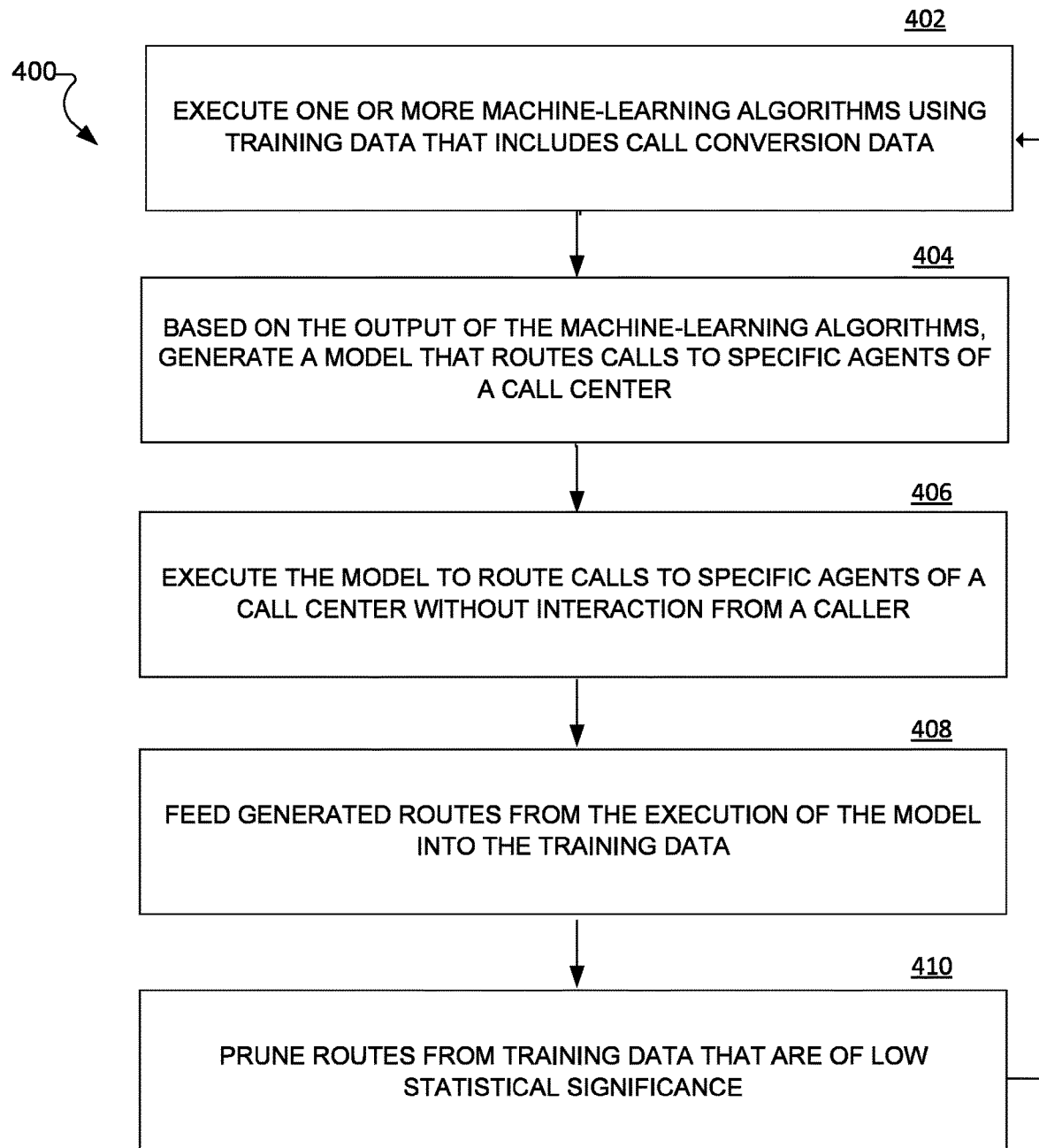
FIG. 4 is a flowchart or of an example machine-learning process used to route calls, according to aspects of the present disclosure.

In some embodiments of the current disclosure, the call conversion tracking system 120 may include artificial intelligence and machine learning to create prediction models to more effective manage the interaction between the call conversion tracking system 120 and the digital advertising platforms based on the data monitored from the call center operations system. FIG. 4 illustrates a process 400 for using artificial intelligence to route calls to specific agents within a call center pool.

As illustrated in FIG. 4, the process 400 begins at step 402 with executing one or more machine-learning algorithms to training data that includes call conversion data. In some instances, the call conversion data may include one or more independent variables or parameters that associate certain a particular customer call and/or customer with a specific call center agent included in a call center. In another example, the system may use one or more machine-learning algorithms to training data that includes user interaction data. In such a scenario, the user interaction data may include one or more independent variables or parameters that associate certain a particular call and/or customer with a particular user interaction.

Stated differently, the training data may include an extremely large (not human processable) data set of call conversion data collected over several years and/or based on hundreds of thousands of calls. The training data may further include validation data that identifies prior outcomes (e.g., valid routed call center agents) for such variables. Example machine-learning techniques that may be applied include linear regression, non-linear regression, Bayesian modeling, Monte Carlos methods, neural networks, random forest, k-means clustering, among others.

In one specific example, the machine-learning mechanism may generate correlations between a set of independent variables of the call conversion data (e.g., pre-determined or automatically identified) and appropriate agents of a call center, for example using linear regressions. In another example, the machine-learning mechanism may generate correlations between a set of independent variables of o the user interactions (e.g., pre-determined or automatically identified per-click interactions) and a voice call (e.g. causation) or the initiation of a voice call, for example using linear regressions. Thus, at 404, the system is trained to generate a set of algorithm constants, which when applied to a real-time set of call conversion data or user interaction data (e.g., obtained from the call conversion system): 1) automatically generates a model that routes calls to specific call center agents of a call center; or 2) correlates user interactions with Referring again to FIG. 4, and 406, the generated model is executed to automatically generate routes or otherwise automatically route customer calls to a specific agent of a call center, without any caller interaction. For example, a customer call may be automatically routed without using natural language processing (NLP) techniques/technologies. As another example, a customer call may be routed without the use of interactive voice response techniques/technology ("IVR"). In the scenario in which the data includes user data, the generated model is executed to automatically generate captures both the voice communication call data and the actual sales-related data, and associate voice communication call data and the actual sale.

At 408, in some instances, the results (i.e., the predicted call routes) from executing the generated model(s) are automatically fed back into the training data. For example, a new predictions of a specific call route connecting a customer call to specific call center agent may be generated and used to route the particular call. And the call route may be fed back into or otherwise aggregated into the training data. In another example, any generated correlations between user interactions (e.g., specific clicks) and voice calls may be fed back into the system as training data. Then, the training process (operation 402) may be repeated and thereby incorporate the newly predicted or otherwise generated call route(s) connecting customer calls to specific call center agent(s) into the training set. In some instances, new classification mechanisms and/or correlations may be identified and incorporated into any newly generated models, in view of the supplemented training data. The updated and/or newly generated models may be integrated into the predicto logic of the call conversion tracking system 120 and utilized for further predictions of call routes connecting customer calls to specific call center agents.

Referring again to FIG. 4, the processed training data and generated predictions are stored (and continuously stored) into the database 220. At 410, in some instances, the stored training data and predictions maybe pruned of data that is of low significance. More specifically, some call route determinations may be included within the training dataset, which have not been observed a sufficient number of times to have statistically significant outcome association. In such instances, it may be desirable to prune those call routes of low significance, such as by removing from the call routes from the larger training dataset and thereby keep the removed data from impacting newly generate call routes.

Figure 5:
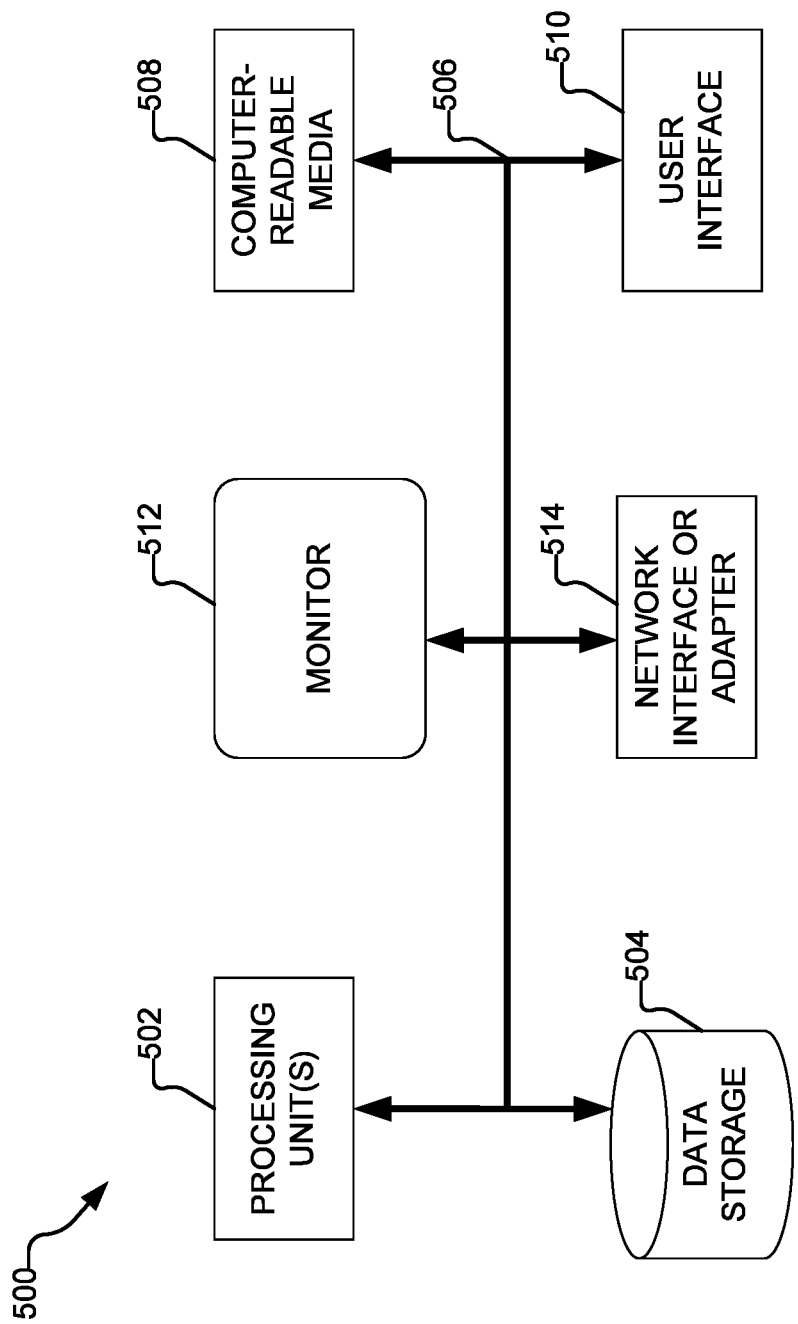
FIG. 5 is a block diagram illustrating a computing device specifically implemented to automatically track call-based communications and automatically route calls, according to aspects of the present disclosure.

FIG. 5 illustrates an example of a suitable computing and networking environment 500 that may be used to implement various aspects of the present disclosure described in FIGS. 1-2, such as the call conversion tracking system 120. As illustrated, the computing and networking environment 500 includes a general purpose computing device 500, although it is contemplated that the networking environment 500 may include one or more other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the computer 500 may include various hardware components, such as a processing unit 502, a data storage 504 (e.g., a system memory), and a system bus 506 that couples various system components of the computer 500 to the processing unit 502. The system bus 506 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 500 may further include a variety of computer-readable media 508 that includes removable/non-removable media and volatile/nonvolatile media, but excludes transitory propagated signals. Computer-readable media 508 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/ data and which may be accessed by the computer 500. Communication media includes computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The data storage or system memory 504 includes computer storage media in the form of volatile/nonvolatile memory such as read only memory (ROM) and random access memory (RAM). A basic input/output system (BIOS), containing the basic routines that help to transfer information between elements within the computer 500 (e.g., during start-up) is typically stored in ROM. RAM typically contains data and/or program modules that are immediately accessible to and/or presently being operated on by processing unit 502. For example, in one embodiment, data storage 504 holds an operating system, application programs, and other program modules and program data.

Data storage 504 may also include other removable/non-removable, volatile/nonvolatile computer storage media. For example, data storage 504 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media, described above and illustrated in FIG. 5, provide storage of computer-readable instructions, data structures, program modules and other data for the computer 500.

A user may enter commands and information through a user interface 510 or other input devices such as a tablet, electronic digitizer, a microphone, keyboard, and/or pointing device, commonly referred to as mouse, trackball, or touch pad. Other input devices may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices are often connected to the processing unit 502 through a user interface 510 that is coupled to the system bus 506, but may be connected by other interface and bus structures, such as a parallel port, game port or a universal serial bus (USB). A monitor 512 or other type of display device is also connected to the system bus 506 via an interface, such as a video interface. The monitor 512 may also be integrated with a touch-screen panel or the like.

The computer 500 may operate in a networked or cloud-computing environment using logical connections of a network interface or adapter 514 to one or more remote devices, such as a remote computer. The remote computer may be a personal computer, a server, a router, a network PC, a peer device or other common network node, and typically includes many or all of the elements described above relative to the computer 500. The logical connections depicted in FIG. 5 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 500 may be connected to a public and/or private network through the network interface or adapter 514. In such embodiments, a modem or other means for establishing communications over the network is connected to the system bus 506 via the network interface or adapter 514 or other appropriate mechanism. A wireless networking component including an interface and antenna may be coupled through a suitable device such as an access point or peer computer to a network. In a networked environment, program modules depicted relative to the computer 500, or portions thereof, may be stored in the remote memory storage device.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:
1. A method for call conversion comprising:
modifying in real-time, using a computing device, invitational content by including a phone number in the invitational content during presentation of the invitational content at the computing device, the invitational content modified to monitor users interacting with the invitational content, the invitational content identifying an advertising campaign for a particular product;
obtaining, using the computing device, user interactions of a user interacting with the invitational content;
determining, using the computing device, a service need of the user based on the user interactions;
determining, using the computing device and in response to a voice call initiated by the user, an agent of a plurality of agents to assist the user based on the determined service need;
routing, using the computing device, the voice call initiated by the user to the determined agent;
obtaining, using the computing device and subsequent to connecting the voice call with the determined agent, voice communication data from the voice call initiated by the user in response to the advertising campaign; and
generating, using the computing device, a graphical user-interface based on the voice communication data, wherein the graphical user-interface displays information that includes a correlation between a particular user interaction of the user interactions and a portion of the voice communication data,
wherein the service need of the user is determined prior to the voice call being initiated by the user.

2. The method of claim 1, wherein the information correlating the particular user interaction of the user interactions with a portion of the voice communication data comprises a user interaction that caused the user to initiate the voice call.

3. The method of claim 1, further comprising:
obtaining geographic information associated with the computing device; and
wherein the graphical user-interface displays the information correlating the particular user interaction of the user interactions with the portion of the voice communication data based on the geographic information.

4. The method of claim 1, wherein the graphical user-interface is a customer relationship management interface.

5. The method of claim 1, further comprising associating the determined service need of the user with the phone number included in the invitational content prior to the voice call being initiated by the user.

6. The method of claim 1, wherein the service need of the user is determined from metadata capturing the actions of the user.

7. The method of claim 1, wherein the service need of the user is determined using a machine learning model.

8. A system for call conversion comprising:
a memory; and
a computer processor coupled to the memory, the computer processor configured to:
modify in real-time invitational content by including a phone number in the invitational content during presentation of the invitational content at the computing device, the invitational content modified to monitor users interacting with the invitational content, the invitational content identifying an advertising campaign for a particular product;
obtain user interactions of a user interacting with the invitational content;
determine a service need of the user based on the user interactions;
determine, in response to a voice call initiated by the user, an agent of a plurality of agents to assist the user based on the determined service need;
route the voice call initiated by the user to the determined agent;
obtain, subsequent to connecting the voice call with the determined agent, voice communication data from the voice call initiated by the user in response to the advertising campaign; and
generate a graphical user-interface based on the voice communication data, wherein the graphical user-interface displays information that includes a correlation between a particular user interaction of the user interactions and a portion of the voice communication data, wherein the service need of the user is determined prior to the voice call being initiated by the user.

9. The system of claim 8, wherein the information correlating the particular user interaction of the user interactions with a portion of the voice communication data comprises a user interaction that caused the user to initiate the voice call.

10. The system of claim 8, wherein the computer processor is further configured to:
obtain geographic information associated with the computing device; and
wherein the graphical user-interface displays the information correlating the particular user interaction of the user interactions with the portion of the voice communication data based on the geographic information.

11. The system of claim 8, wherein the graphical user-interface is a customer relationship management interface.

12. The system of claim 8, wherein the service need of the user is determined from metadata capturing the actions of the user.

13. The system of claim 8, wherein the service need of the user is determined using a machine learning model.

14. A non-transitory computer readable medium encoded with instructions for call conversion, the instructions, executable by a processing device, comprising:
modifying in real-time invitational content by including a phone number in the invitational content during presentation of the invitational content at the computing device, the invitational content modified to monitor users interacting with the invitational content, the invitational content identifying an advertising campaign for a particular product;
obtaining user interactions of a user interacting with the invitational content;
determining a service need of the user based on the user interactions;
determining, in response to a voice call initiated by the user, an agent of a plurality of agents to assist the user based on the determined service need;
routing the voice call initiated by the user to the determined agent;
obtaining, subsequent to connecting the voice call with the determined agent, voice communication data from the voice call initiated by the user in response to the advertising campaign;
generating a graphical user-interface based on the voice communication data, wherein the graphical user-interface displays information that includes a correlation between a particular user interaction of the user interactions and a portion of the voice communication data, wherein the service need of the user is determined prior to the voice call being initiated by the user.

15. The non-transitory computer readable medium of claim 14, further wherein the information correlating the particular user interaction of the user interactions with a portion of the voice communication data comprises a user interaction causing the user to initiate the voice call.

16. The non-transitory computer readable medium of claim 14, wherein the graphical user-interface is a customer relationship management interface.

17. The non-transitory computer readable medium of claim 14, further comprising:
obtaining geographic information associated with the computing device; and
wherein the graphical user-interface displays the information correlating the particular user interaction of the user interactions with the portion of the voice communication data based on the geographic information.

18. The non-transitory computer readable medium of claim 14, wherein the service need of the user is determined from metadata capturing the actions of the user.

19. The non-transitory computer readable medium of claim 14, wherein the service need of the user is determined using a machine learning model.

* * * * *